US005518755A

United States Patent [19]

Wong et al.

[11] Patent Number: 5,518,755
[45] Date of Patent: May 21, 1996

[54] REDUCED FAT NUT SPREADS AND CONTINUOUS PROCESS FOR MAKING

[75] Inventors: Vincent Y. Wong, Hamilton; Francisco V. Villagran, W. Chester; Richard J. Sackenheim, Hamilton, all of Ohio

[73] Assignee: The Procter & Gamble Company, Cincinnati, Ohio

[21] Appl. No.: 407,264

[22] Filed: Mar. 23, 1995

Related U.S. Application Data

[63] Continuation-in-part of Ser. No. 245,084, May 17, 1994, abandoned.

[51] Int. Cl.⁶ .................................................. A23L 1/38
[52] U.S. Cl. ........................ 426/633; 426/518; 426/519
[58] Field of Search ................................. 426/518, 519, 426/633

[56] References Cited

U.S. PATENT DOCUMENTS

| | | | |
|---|---|---|---|
| 3,317,325 | 5/1967 | Durst | 99/126 |
| 3,619,207 | 11/1971 | Dzurik | 426/633 |
| 4,000,322 | 12/1976 | Billerbeck et al. | 426/72 |
| 4,004,037 | 1/1977 | Connick | 426/324 |
| 4,062,986 | 12/1977 | Billerbeck et al. | 426/633 |
| 4,273,795 | 6/1981 | Bosco et al. | 426/602 |
| 4,329,375 | 5/1982 | Holloway, Jr. et al. | 426/632 |
| 4,814,195 | 3/1989 | Yokoyama et al. | 426/633 |
| 4,828,868 | 5/1989 | Lasdon et al. | 426/633 |
| 5,079,027 | 1/1992 | Wong et al. | 426/633 |
| 5,230,919 | 7/1993 | Walling et al. | 426/633 |
| 5,366,7,54 | 11/1994 | Rudan et al. | 426/633 |

Primary Examiner—Helen Pratt
Attorney, Agent, or Firm—Tara M. Rosnell; Eric W. Guttag; Rose Ann Dabek

[57] ABSTRACT

A continuous process for preparing a high protein or low fat nut spread having desirable fluidity, texture and flavor. The process comprises as a first step depositing a nut paste in a mixing tank. Next, the solid ingredients which are to be present in the final product spread are mixed into the tank containing the peanut paste and the mixture is pumped through a high shear mixer. The temperature of the mixture is then adjusted so that the temperature of the mixture exiting the homogenizer is less than about 240° F. The mixture is then pumped through a homogenizer at a pressure ranging from about 9,000 to about 14,500 psig, a colloid mill, a versator and a scraped wall heat exchanger. Nut spreads having a monomodal or bimodal particle size distribution such that at least 50% of the solids in the nut spread have a particle size of less than 18 microns and 90% of the solids in the nut spread have a particle size of less than 60 microns, and further having a Casson plastic viscosity of from about 8 to about 17 poise and a yield value of less than about 300 dynes per square centimeter are produced according to this process.

17 Claims, No Drawings

5,518,755

REDUCED FAT NUT SPREADS AND CONTINUOUS PROCESS FOR MAKING

This is a continuation-in-part of application Ser. No. 08/245,084, filed on May 17, 1994, now abandoned.

FIELD OF THE INVENTION

The present invention relates to a continuous process for adding solids to peanut paste that results in a fluid, nongritty nut spread having superior peanut flavor. Reduced fat peanut spreads having desirable fluidity and smooth texture can be prepared according to the continuous process of the present invention.

BACKGROUND OF THE INVENTION

Conventional peanut and other nut butters or spreads consist of a mixture of solid nut particles, liquid oil, flavorants, e.g., a sweetener such as sugar, high fructose corn syrup or honey, and salt, and a stabilizer. Peanut butters typically contain about 50% oil and about 50% solids. Peanut butters containing these levels of solids and oil have good texture, spreadability and flavor.

For some applications, however, it is desirable to have a peanut spread which contains higher levels of solids. This may be the case, for example, when a high protein and/or reduced fat nut spread is desired. High protein and/or reduced fat nut spreads are typically prepared by increasing the level of solid ingredients present in the final product relative to the level of oil. Reduced fat peanut spreads, for example, typically comprise from about 58% to about 75% solids and from about 25% to about 42% oil.

Unfortunately, increasing the level of solids in the nut spread relative to the level of oil can have deleterious effects on the quality of the nut spread. For example, increasing the level of solids in a nut spread can increase the viscosity of the spread such that the spread is undesirably stiff (e.g., nonfluid). Indeed, spreadability or fluidity is highly sensitive to the oil content of the nut spread; the lower the oil content, the harder the product is to spread. The addition of non-nut solids also reduces the fluidity of the nut spread by creating a polymodal particle size distribution for the finished nut spread (reduced fat nut spreads desirably have a monomodal or bimodal particle size distribution). Increasing the level of solids in a nut spread relative to the level of oil can also adversely impact the texture of the nut spread. The solid particles create an undesirable sensation of grittiness upon mastication of the nut spread. Lastly, increasing the level of solids in a nut spread can adversely affect the flavor of the nut spread by diluting the peanut flavor.

Past attempts to provide nut spreads which have the combination of desirable fluidity, smooth texture and desirable flavor but which contain a high level of solids (e.g., greater than about 58%) have not been wholly successful. Efforts to reduce grittiness have resulted in a high viscosity spread. Moreover, attempts to reduce viscosity have resulted in nut spreads with less flavor compared to full fat peanut butters. A process taught by Wong et al. utilized a roll milling operation to prepare defatted peanut solids for use in a low fat peanut spread. See U.S. Pat. No. 5,079,027 issued Jan. 7, 1992. Another process taught by Walling et al utilizes extrusion roasting or a combination of roll milling and high shear mixing to prepare defatted peanut solids to be combined with undefatted peanuts in the preparation of a low fat peanut spread. See U.S. Pat. No. 5,230,919 issued Jul. 27, 1993. The use of defatted peanuts and intense processing conditions in these processes resulted in peanut spreads with inferior flavor compared to full fat peanut butters. Moreover, the roll milling and extrusion roasting processes taught by Wong et al. and Walling et al. are relatively capital intensive for a peanut manufacturing operation.

It is therefore an object of the present invention to provide a continuous process for preparing high protein and/or reduced fat nut spreads which have desirable texture (e.g., are not gritty) and fluidity and which have a nut flavor comparable to that of conventional full fat nut butters.

Co-pending U.S. patent application Ser. No. 08/136,524 (Wong et al), filed Oct. 14, 1993, also discloses a process for preparing high protein and/or reduced fat nut spreads which have desirable texture and fluidity and which have a nut flavor comparable to conventional full fat nut spreads. The process of the present invention is an improvement over the prior Wong process in several ways. First, the process of the present invention does not require that the Casson plastic viscosity of the nut spread mixture be adjusted to less than 30 poise before being pumped through the homogenizer. Instead, the homogenizer is operated at higher pressures (between 9,000 and 14,500 psig compared to less than 8,000 psig in the prior application). This makes the processing of the nut spread easier and less costly. Second, the mechanism for preparing the nut butters is different. In the prior Wong application, the viscosity of the nut butter actually rose after homogenization. This does not occur in the process of the present invention because of the higher solids concentration during homogenization (higher particle to particle sharing). Also, the cooling step of the process of the present invention contributes to certain flavor benefits that are recognized in nut spreads prepared according to the process of the present invention (e.g., gets rid of any off flavor that might otherwise result).

SUMMARY OF THE INVENTION

The present invention relates to a continuous process for preparing a high protein or low fat nut spread having desirable fluidity, texture and flavor. The process comprises as a first step depositing a nut paste in a mixing tank (step a). Next, the solid ingredients which are to be present in the final product spread are mixed into the tank containing the peanut paste and the mixture of peanut paste and solid ingredients is passed through a high shear mixer (step b). The temperature of the mixture is then adjusted such that the temperature of the nut paste exiting the homogenizer in step (d) is less than 240° F. (step c). This mixture is then pumped through a homogenizer at a pressure ranging from about 9,000 to about 14,500 psig (step d), a colloid mill (step e) and finally a versator and a scraped wall heat exchanger (step f). The nut spread product has a monomodal or bimodal particle size distribution such that at least 50% of the solids in the nut spread have a particle size of less than 18 microns and 90% of the solids in the nut spread have a particle size of less than 60 microns, a Casson plastic viscosity of from about 8 to about 17 poise and a Casson yield value of less than about 300 dynes per square centimeter.

DETAILED DESCRIPTION OF THE INVENTION

The present invention relates to a continuous process for preparing high protein and/or low fit nut spreads having desirable fluidity, texture and flavor. The term "nut spread" as used herein means a spreadable food product made from nut solids and oil. Nut spreads typically contain from about 58% to about 75% solids and from about 25% to about 42% oil or fat. The remainder of the nut spread comprises additives such as sweeteners, stabilizers, flavoring agents, proteins and non-nutritive bulking agents. The process of the present invention is particularly suitable for preparing low fat (25% to 42% total fat) peanut spreads.

The materials used in the process of the present invention, the steps of the process, and products prepared according to the process are described in detail as follows:

I. Process Materials

The materials used in the process of the present invention include nut paste and solid ingredients, as well as other optional ingredients.

A. Nut paste

The process of the present invention utilizes a nut paste, preferably peanut paste, as a starting material. While this invention will be generally described in terms of peanuts and peanut paste, it should be readily apparent that other materials such as almonds, pecans, walnuts, cashews, filberts, macadamia nuts, brazilians, sunflower seeds, sesame seeds, pumpkin seeds and soybeans could be used to form the nut paste utilized in the process of the present invention. The term "nut" as used herein encompasses these nuts and seeds. Mixtures of these nuts and oil seeds can also be used.

The nut paste can be formed by any of a number of known methods. For example, the nuts can be roasted and then ground in a conventional grinder or mill such as a Bauer mill to produce a nut paste of pumpable consistency. The nut paste may optionally be defatted or the particle size of the nut solids of the nut paste may be reduced. See, for example Wong et at.; U.S. Pat. No. 5,079,027, Issued Jan. 7, 1992, herein incorporated by reference.

The nut paste will typically comprise from about 50% to about 90% of the nut spread. Preferably, the nut paste will comprise form about 50% to about 85% of the nut spread. More preferably, the nut paste will comprise from about 55% to about 65% of the nut spread.

B. Solid ingredients

The process of the present invention also utilizes solid ingredients as a starting material. The solid ingredients used to prepare fluid, nongritty, nut spreads by the process of this invention can include, for example; diluents such as corn syrup solids, maltodextrin, dextrose, polydextrose, liber, mono- and disaccharides, starches (e.g., corn, potato, wheat) and flours (e.g., wheat, rye, pea); protein supplements such as additional peanut solids, soy flour, soy concentrate, soy isolate, casein, egg whites, and protein from other animal or vegetable sources; or a combination of the above.

The solid ingredients which are added to the nut paste typically comprise from about 13% to about 50% of the nut spread. Preferably, the solid ingredients comprise from about 38% to about 45% of the nut spread. More preferably, the solid ingredients comprise form about 32% to about 43% of the nut spread.

C. Other Optional Ingredients

In addition to the nut paste and the solid ingredients described hereinabove, the process of the present invention may optionally utilize other ingredients. For example, low calorie oils and zero calorie oils such as sucrose polyesters of long chain fatty acids (olestra) and other polyol polyesters of fatty acids can be used (see for example U.S. Pat. Nos. 3,600,186 to Mattson, et al. and 4,005,196 to Jandacek). Mixed triglycerides made from medium and long chain saturated and/or unsaturated fatty acids can also be used herein. An oil which contains at least 10% medium chain triglycerides can also be used. Medium chain triglycerides contain saturated fatty acids having from six to twelve carbon atoms. Reduced calorie peanut butters containing medium chain triglycerides are described in U.S. Pat. No. 4,863,753 (Hunter, et al., 1989).

The nut spread prepared according to the process of the present invention may also optionally contain a stabilizer. The stabilizer can be any of the known peanut butter stabilizers, for example, hydrogenated rapeseed oil, or other hydrogenated triglycerides having a high proportion of $C_{20}$ and $C_{22}$ fatty acids. (See for example, U.S. Pat. No. 3,597, 230 and U.S. Pat. No. 3,192,102.) Stabilizers are usually triglycerides which are solid at room temperature. They solidify in the nut butter in specific crystalline states and keep the oil from separating. These materials can be mixed with a second hydrogenated oil having an iodine value of less than 8, for example hydrogenated palm oil, canola oil, soybean oil, cottonseed oil, coconut oil, and similar materials. This stabilizer can also be mixed with lower melting fat fractions as, for example, the peanut butter stabilizer composition disclosed in U.S. Pat. No. 4,341,814 (1982).

In addition to the stabilizer, or in lieu thereof, an emulsifier can be used in the process of the present invention. The emulsifier can be any food compatible emulsifier such as mono- and di-glycerides, lecithin, sucrose monoesters, polyglycerol esters, sorbitan esters, polyethoxylated glycerols and mixtures thereof. Up to about 3% and preferably from 1% to 3% stabilizer or emulsifier is used.

The process described herein can also optionally utilize flavorants. "Flavorants," as the term is used herein, are agents which contribute to or enhance the flavor of the nut butter. These include sweeteners, flavor enhancers, artificial sweeteners, natural and artificial flavors, flavored or candied bits, nut chunks and other additives which contribute to the flavor of the spread. Sweeteners are selected from the group consisting of sugars, sugar mixtures, artificial sweeteners and other naturally sweet materials. Sugars include, for example, sucrose, fructose, dextrose, honey, molasses, high fructose corn syrup, lactose, maltose, and maltose syrups. Preferably, the sweetener will be something which has a sweetness intensity about that of sucrose or fructose. Sweeteners are generally added at a level of 0% to about 8%; preferably from about 1% to about 6%.

Artificial sweeteners such as aspartame, acesulfam, saccharine, cyclamate, and glycyrrhizin can also be used. The amount of artificial sweetener used would be that effective to produce the sweetness that is desired; and would be about the equivalent of the addition of from about 1% to 7% of sucrose.

Flavor enhancers including salt or salt substitutes such as potassium chloride, sodium chloride/potassium chloride mixtures, and seasoned salts can also be used. The level of flavor enhancer used is a matter of the desired taste level, but usually is from about 0.1% to about 2%. Other flavorants include natural or artificial peanut flavors, roasted flavors, and praline/caramel flavors, walnut flavors, almond flavors and flavor compositions.

The process of the present invention can also employ nut chunks, and other flavored additives which can be mixed with the peanut spread. These additives include chocolate chips or bits or other flavored bits, e.g. butterscotch and peanuts, jellies, (either low calorie jellies or regular jelly or preserves), and praline nuts or other candies. These additives are usually added at a level of from about 1% to about 20% by weight. Nut chunks and flavored bits can contain fats and oils. Therefore, the addition of these materials can affect the fat content and the calorie level of the nut spread.

II. Process steps

The process of the present invention involves as a first step depositing the hereinbefore described peanut paste into a mixing tank. Next, the solid ingredients are added to the mixing tank containing the peanut paste and the mixture of peanut paste and solid ingredients is passed through a high shear mixer. The temperature of the mixture is then adjusted so that the temperature of the nut paste exiting the homogenizer is less than 240° F. Next, the mixture is pumped through a homogenizer at a pressure ranging from about 9,000 psig to about 14,500 psig and then a colloid mill. Finally, the mixture is passed through a versator and a scraped wall heat exchanger. Nut spreads prepared according to this process will have a monomodal or bimodal particle distribution such that at least 50% of the solids in the nut spread have a particle size of less than about 18 microns and at least 90% of the solids in the nut spread have a particle size of less than about 60 microns. Nut spreads prepared according to the process of the present invention will further have a Casson plastic viscosity of from about 8 to about 17 poise and a Casson yield value of less than about 300 dynes/cm2.

Each of the basic steps of the process of the present invention is described in detail as follows:

A. Depositing the peanut paste into mixing tank

As a first process step, the hereinbefore described peanut paste is deposited into a mixing tank such as a Hamilton kettle. The peanut paste is then mixed as the solid ingredients are added as described hereinafter in step (B).

B. Mixing the solid ingredients into the tank containing the peanut paste and passing the resulting mixture through a high shear mixer In a second process step, the solid ingredients are added to the mixing tank containing the peanut paste and mixed into the peanut paste. The solid ingredients are typically added gradually over a time period ranging from about 15 to about 45 minutes. It may be desirable to add the corn syrup solids and the sugar and flavorants first, followed by the protein solids, particularly when making a crunchy peanut spread. The mixture of peanut paste and solid ingredients is passed through a high shear mixer such as a colloid mill, and typically a heat exchanger, before proceeding with step (c) described hereinafter. In a preferred embodiment, as the solid ingredients are gradually added, a portion of the resulting mixture of peanut paste and solid ingredients is simultaneously recycled through a colloid mill and back into the mixing tank. This recycling is generally continued at least until all of the solids have been added. Typically, but not necessarily, the recycling is continued until the Casson plastic viscosity of the mixture of peanut paste and solids is in the range of from about 60 to about 70 poise. In any event, the Casson plastic viscosity of the mixture at this point in the process will exceed 30 poise.

C. Adjusting the temperature of the mixture such that the temperature exiting the homogenizer in step (d) will be less than about 240° F.

The mixing and colloid milling employed in step (b) described hereinabove causes the temperature of the mixture of peanut paste and solids to rise. When the temperature of the mixture exiting the homogenizer (described hereinafter in step (D)) exceeds 240° F., the nut spread will be very viscous due to unfolding, denaturation and oil absorption of the soy proteins as well as carmelization of the sucrose, molasses and corn syrup solids that occurs at these high temperatures. This makes the nut spread extremely difficult to process. However, if the temperature of the mixture as it exits the homogenizer in step (d) described hereinafter is less than about 240° F., the nut spread exiting the homogenizer will be desirably fluid and easy to process.

When the homogenizer is operated at a pressure of 12,000 psig, the temperature of the mixture before it enters the homogenizer should be adjusted to less than about 68.3° C. to ensure that the temperature of the nut spread exiting the homogenizer does not exceed 240° F. Preferably, when the homogenizer is operated at a pressure of 12,000 psig, the temperature of the mixture entering the homogenizer is from about 65.5° C. (150° F.) to about 68.3° C. (155° F.). In general, for every 1000 psig increase in pressure, the temperature of the mixture as it exits the homogenizer increases by about 6° F. The temperature of the mixture can be adjusted to within the desired range by any of a number of conventional methods, e.g., the use of heat exchangers.

D. Pumping the mixture containing the peanut paste and the solid ingredients through a homogenizer at a pressure ranging from about 9,000 to about 14,500 psig After the temperature of the mixture has been adjusted as described hereinabove in step (c), the mixture is pumped through a homogenizer, such as a Rannie Model 1351 homogenizer, at a pressure ranging from about 9,000 to about 14,500 psig. Preferably, the pressure in the homogenizer ranges from about 11,000 to about 13,000 psig. Most preferably, the pressure in the homogenizer is 12,000 psig. The purpose of the homogenizer is to break down the particle size of the solids so that the solids will not impart an undesirable sensation of grittiness to the nut spread upon mastication. The homogenizer also changes the particle size distribution of the spread from polymodal to monomodal or bimodal, which results in a lower viscosity for the final nut spread product.

After homogenization the particle size distribution of the particles is such that at least about 50% of the solids have a particle size of less than about 18 microns, preferably less than 15 microns, more preferably less than 13 microns and at least about 90% of the solids have a particle size of less than about 60 microns, preferably less than about 52 microns, more preferably less than about 40 microns. Nut spreads in which at least 90% of the solids have a particle size of less than 60 microns will have a smooth texture (e.g., they will not be gritty). A cell disruption valve can optionally be used in the homogenizer to achieve a higher particle size breakdown at lower pressures.

A heat exchanger may optionally be used after the homogenizer to cool the mixture before it reaches the colloid mill. Use of a heat exchanger can prevent flavor degradation and help to increase the efficiency of the colloid mill.

E. Pumping the homogenized mixture through a colloid mill

Next, the homogenized mixture is pumped through a colloid mill such as a Greerco Colloid Mill to reduce the viscosity of the mixture. Typically, the colloid mill is operated with a wide open gap at about 3600 rpm.

F. Passing the homogenized, colloid milled mixture through a versator and a scraped wall heat exchanger Finally, the nut spread is finished by passing the mixture through a versator and a scraped wall heat exchanger to increase the oxidative stability of the nut spread product and to set up the crystalline structure of the nut spread. The scraped wall heat exchanger is typically operated such that the freezer outlet temperature is between 97° and 100° F. Chunks or pieces of full fat nuts may be added if desired.

Finished nut spreads prepared according to the process of the present invention will have a Casson plastic viscosity of from about 8 to about 17 poise, preferably from about 8 poise to about 15 poise, more preferably from about 8 poise to about 12 poise. The product will further have a yield value of less than about 300 dynes per square centimeter, preferably less than about 250 dynes per square centimeter, more preferably less than about 225 dynes per square centimeter.

The particle size distribution of the product is monomodal or bi-modal. Preferably at least 50% of the solids in the nut spread have a particle size of less than 18 microns, preferably less than 15 microns, most preferably less than 13 microns and at least 90% of the solids have a particle size of less than 60 microns, preferably less than 52 microns, more preferably less than 40 microns.

In an especially preferred embodiment of the present invention, the water insoluble solids present in the nut butters and spreads of the present invention have a bimodal particle size distribution such that from about 80% to about 87% of the water insoluble solids comprising the nut butter or paste have a particle size of less than about 21.6 microns, from about 75% to about 83% of the water insoluble solids comprising the nut butter or spread have a particle size of less than about 16.7 microns, from about 65% to about 73% of the water insoluble solids comprising the nut butter or spread have a particle size of less than about 13.0 microns, from about 55% to about 60% of the water insoluble solids comprising the nut butter or spread have a particle size of less about 10.1 microns, from about 43% to about 50% of the water insoluble solids comprising the nut butter or spread have a particle size of less than about 7.9 microns and from about 25% to about 30% of the water insoluble solids comprising the nut butter or spread have a particle size of less than about 6.2 microns.

As used herein, "water insoluble solids" means those solids present in the nut spread product which are capable of binding fats in more than one way. For example, water insoluble solids may bind fat onto their surface and/or may absorb fat into their interior. Water insoluble solids present in the nut paste can include, for example, nut solids, protein from any grain or animal source, starches and fibers.

The nut spreads prepared according to the process of the present invention will have a total fat content of from about 25% to about 42%. Preferably, the nut spreads prepared according to the process of he present invention will have a total fat content ranging from about 28% to about 38%, more preferably from about 30% to about 36%, and most preferably from about 30% to about 32%. Such nut spreads are fluid and have desirable texture (e.g., not gritty) and flavor.

ANALYTICAL TEST METHODS

A number of parameters used to characterize elements of the present invention are quantified by particular experimental analytical procedures. Each of these procedures is described in detail as follows:

1. Casson Plastic Viscosity and Casson Yield Value and Nut Spread

A Brookfield Viscometer (HAT series), 5C4-13R chamber with a 8C4-27 spindle is used. This arrangement consists of a spindle "bob" of 0.465 inches (1.12 cm). The inner diameter of the sample cell is 0.750 inches (1.87 cm). The instrument is calibrated at 65° C. and all samples are measured at 65° C.

A sample of 14.0 grams of nut spread (unaerated) is placed in the sample cell. The sample cell is then inserted in the jacketed cell holder. To compensate for heat losses through the tubings, etc., the water temperature entering the jacketed cell holder should be a few degrees higher than the desired sample temperature of 65° C. After the temperature of the sample has reached 65° C. the sample is pre-sheared for five minutes at 50 rpm. The speed is then changed to 100 rpm and a measurement taken after the dial reading settles to a constant value. A total of five scale readings are recorded for 100, 50, 20, 10 and 5 rpm. In general, the time before reading should be as set forth in Table I.

TABLE 1

| RPM | Time Before Reading (Seconds) |
|---|---|
| 100 | 3 |
| 50 | 6 |
| 20 | 15 |
| 10 | 30 |
| 5 | 60 |

The dial reading and rpm are converted into shear stress and shear rate values by multiplying the rpm and dial reading by 0.34 and 17, respectively. A plot of the square root of shear stress vs. the square root of shear rate results in a straight line. Readings where the dial pointer goes off scale are ignored. A least squares linear regression is made over the data to calculate the slope and intercept.

This data is used to calculate two values. The first of these is the plastic viscosity which is equal to the slope of the line squared. The plastic viscosity is a measurement of the nut spread's viscosity at an infinite shear rate. It accurately predicts the resistance to flow in pumping, moving or mixing situations. The Casson plastic viscosity is measured in poise.

The second value is the yield value which is equal to the value of the x intercept (abscissa) squared. The yield value is a measure of amount of force or shear that is necessary to get the nut spread to start moving. The yield value is measured in dynes per square centimeter. The relationship between the plastic viscosity and the yield value determine how a nut spread will behave in additional processing.

2. Particle Size Analysis

A Malvern 2600D particle size analyzer with an IBM PS/2 computer was used to analyze the particle size of the samples. A small amount (about 0.01 grams) of its sample was placed in a 25 ml test tube and about 15 ml of acetone are added to it. The sample is dispersed in the acetone by using a vortex mixer. A transfer pipette is then used to add this diluted solution dropwise to the acetone filled cell of the analyzer. The sample is added until the obscuration is 0.2 to 0.3. The obscuration refers to the amount of light which is obscured by the sample because of diffraction and absorption. The instrument roads more accurately when the obscuration is 0.05 to 0.5 and preferably from 0.2 to 0.3 (20% to 30% of the light energy is reduced).

The apparatus is fitted with a 100 mm lens to determine the particle size of the paste. Particle sizes from 0.5 to 188 microns can be measured using a 100 mm lens. A magnetic stirrer is used to insure that the sample is being dispersed during the readings. Each sample is swept 250 times by the laser for each reading. Each sample was read a minimum of three times with a five (5) minute wait between each reading.

EXAMPLES

Example I

Example I describes a reduced fat peanut spread prepared by a continuous process employing a versator. The ingredients used to prepare this peanut spread are as follows:

| Ingredient | % |
|---|---|
| Peanuts | 61.00 |
| Molasses, Salt and Sugar | 8.50 |
| CBC Stablizer and Emulsifier | 1.95 |

| Ingredient | % |
| --- | --- |
| Soy Protein Isolate | 5.00 |
| Corn Syrup Solids | 23.42 |
| Vitamins/Minerals | 0.14 |

The peanuts are roasted at 422° F. and blanched and ground in a Bauer Mill to form a peanut paste. The peanut paste is then deposited into a 100 gallon Hamilton kettle. The molasses, stabilizer, and emulsifier are added to the mixing tank which is held at a constant temperature of 140° F.

The solid ingredients (corn syrup solids, salt and sugar) are weighed into a Hobart Mixing Bowl. The solids are mixed at low speed for about 15 minutes and then loaded into a K-Tron T-35 Twin Screw feeder positioned over the mixing tank.

The corn syrup solids, sugar and salt are then added to the mixing tank at a constant rate over a time period of about 30 minutes. After these solids have been added, the soy protein solids are mixed in. Throughout the time that the solids are being added to the peanut paste in the mixing tank, a portion of the tank mixture is pumped through a 7.5 inch Greerco W-500 H Colloid Mill operated at a wide open gap and then redeposited in the mixing tank. After all of the solids have been added, the mixture continues to be recycled through the colloid mill until the Casson plastic viscosity is 65.9 poise. Next, the temperature of the mixture is adjusted to about 65.5° C. The mixture is pumped through a Rannie homogenizer at a pressure of 12,000 psig and then a heat exchanger, a colloid mill and another heat exchanger. At this point the nut spread has a Casson plastic viscosity of about 16.1 poise and a yield value of 279.2 dynes per square centimeter. The vitamins and minerals are added to the mixture, and the mixture is passed through a versator and a scraped wall heat exchanger.

The finished nut spread has a Casson plastic viscosity of about 12.5 poise and a yield value of 226.2 dynes per square centimeter. The particle size distribution is near monomodal. At least 50% of the solids in the nut spread have a particles size of less than 18 microns and at least 90% of the solids have a particle size of less than 60 microns. This nut spread is fluid and has a smooth (nongritty texture) and desirable flavor. The fat content of the nut spread is 34%.

Example II

Example II describes a reduced fat peanut spread prepared by a continuous process wherein the solid ingredients are continuously mixed in a twin screw mixing device, e.g., Readco mixer. No recycle stream is employed. The ingredients used to prepare the peanut spread of Example II are the same as those used in Example I. The peanut paste is prepared as in Example I and the solid ingredients are added all at once. After the solids are added the mixture of peanut paste and solid ingredients is pumped through a 7.5 inch Greerco colloid mill operated at a wide open gap. Next, the temperature of the mixture is adjusted to about 65.5° C. The mixture is pumped through a Rannie homogenizer at a pressure of 11,000 psig and then a heat exchanger, a colloid mill, another heat exchanger and a versator. The nut spread has a Casson plastic viscosity of less than 17 poise and a yield value of less than 300 dynes per square centimeter. The particle size distribution is near monomodal. At least 50% of the solids in the nut spread have a particles size of less than 18 microns and at least 90% of the solids have a particle size of less than 60 microns. This nut spread is fluid and has a smooth (nongritty texture) and desirable flavor. The fit content of the nut spread is 34%.

What is claimed is:

1. A process for preparing a low fat nut spread having desirable fluidity, texture, and flavor, which process comprises the steps of:

a) depositing nut paste in a mixing tank;

b) mixing the solid ingredients into the nut paste to form a mixture having a viscosity exceeding 30 poise and from about 25% to about 42% total fat, and passing the mixture through a high shear mixer;

c) adjusting the mixture so that it has a temperature as it exits a homogenizer in step (d) of less than about 240° F.;

d) pumping the mixture through a homogenizer at a pressure ranging from about 9,000 to about 14,500 psig;

e) pumping the mixture through a colloid mill; and f) pumping the mixture through a versator and a scraped wall heat exchanger to provide a nut spread having a distribution such that at least 50% of the solids have a particle size of less than 18 microns, at least 90% of the solids in the nut spread have a particle size of less than about 60 microns, and up to about 73% of the solids in the nut spread have a particle size of less than about 13.0 microns, and further having a Casson plastic viscosity of from about 8 to about 17 poise; and a yield value of less than about 300 dynes per square centimeter.

2. A process according to claim 1 wherein the nut spread has a fat content of from about 28% to about 38%.

3. A process according to claim 2 wherein the homogenizer is operated at a pressure of from about 11,000 to about 13,000 psig.

4. A process according to claim 3 wherein the high shear mixer used in step (b) is a colloid mill.

5. A process according to claim 4 wherein the homogenized mixture of peanut paste and solids is pumped through a heat exchanger before being pumped through the colloid mill in step (e).

6. A process according to claim 5 wherein the Casson plastic viscosity of the nut spread product ranges from about 8 to about 15 poise.

7. A process for making a low fat nut spread having a desirable fluidity, texture and flavor, which process comprises the steps of:

a) depositing nut paste in a mixing tank;

b) mixing solid ingredients into the nut paste to form a mixture having a viscosity exceeding 30 poise and from about 25% to about 42% total fat, and simultaneously recycling a portion of the mixture through a colloid mill and back into the mixing tank;

c) adjusting the mixture so that it has a temperature as it exits a homogenizer in step (d) of less than about 240° F.

d) pumping the tank mixture through the homogenizer at a pressure ranging from about 9,000 to about 14,500 psig;

e) pumping the mixture through a colloid mill; and f) pumping the mixture through a versator and a scraped wall heat exchanger to produce a nut spread having a Casson plastic viscosity of from about 8 to about 17 poise and a yield value of less than about 300 dynes/ cm², and a particle size distribution such that at least about 50% of the solids in the nut spread have a particle size of less than about 18 microns, at least 90% of the solids in the nut spread have a particle size of less than about 60 microns, and up to about 73% of the solids in the nut spread have a particle size of less than about 13.0 microns.

8. A process according to claim 7 wherein the total fat content of the nut spread ranges from about 28% to about 38%.

9. A process according to claim 8 wherein the homogenizer is operated at a pressure of from about 11,000 to about 13,000 psig.

10. A process according to claim 9 wherein the homogenized mixture of peanut paste is pumped through a heat exchanger before being pumped through the colloid mill in step (e).

11. A process according to claim 10 wherein the solid ingredients are added over a time period ranging from about 15 to about 45 minutes in step (b).

12. A process According to claim 11 wherein in step (b) the mixture is recycled through the colloid mill until the mixture has a Casson plastic viscosity ranging from about 60 poise to about 70 poise.

13. A process according to claim 12 wherein in step (c) the mixture is cooled to a temperature ranging from about 149.9° F. to about 154.9° F.

14. A process according to claim 13 wherein the Casson plastic viscosity of the nut spread ranges from about 8 to about 15 poise.

15. A low fat bimodal nut spread which has desirable fluidity, texture and flavor and which comprises:

a) from about 50% to about 90% of a nut paste;

b) from about 13% to about 50% of solid ingredients;

c) from 0% to about 3% stabilizer;

d) from 0% to about 3% emulsifier; and e) from 0% to about 8% flavorant;

wherein the nut butter or nut spread has i) a Casson plastic viscosity ranging from about 8 to about 17 poise; ii) a yield value of less about 300 dynes per square centimeter; iii) from about 25% to about 42% total fat; and iv) a bimodal particle size distribution such that from about 80% to about 87% of the water insoluble solids comprising the nut butter or spread have a particle size less than about 21.6 microns, from about 75% to about 83% of the water insoluble solids comprising the nut butter or spread have a particle size of less than about 16.7 microns, from about 65% to about 73% of the water insoluble solids comprising the nut spread have a particle size of less than about 13.0 microns, from about 55% to about 60% of the water insoluble solids comprising the nut butter or spread have a particle size of less than about 10.1 microns, from about 43% to about 50% of the water insoluble solids comprising the nut butter or spread have a particle size of less than about 7.9 microns and from about 25% to about 30% of the water insoluble solids comprises the nut butter or spread have a particle size of less than about 6.2 microns.

16. The low-fat bimodal nut spread of claim 15, wherein the Casson plastic viscosity of the nut spread ranges from about 8 to about 12 poise.

17. The low-fat bimodal nut spread of claim 16, wherein the fat content of the nut spread ranges from about 28% to about 38%.

* * * * *